US007698359B2

(12) United States Patent
Wray et al.

(10) Patent No.: US 7,698,359 B2
(45) Date of Patent: Apr. 13, 2010

(54) REMOTE SYSTEM ADMINISTRATION USING COMMAND LINE ENVIRONMENT

(75) Inventors: Daryl W. Wray, Redmond, WA (US); Jeffrey P. Snover, Woodinville, WA (US); Rajesh Chandrashekaran, Andhra Pradesh (IN); Shankara Shastry M.C., Andhra Pradesh (IN)

(73) Assignee: Microsoft Corporation, Redmond, WA (US)

( * ) Notice: Subject to any disclaimer, the term of this patent is extended or adjusted under 35 U.S.C. 154(b) by 1386 days.

(21) Appl. No.: 10/759,738

(22) Filed: Jan. 16, 2004

(65) Prior Publication Data

US 2005/0198648 A1    Sep. 8, 2005

(51) Int. Cl.
   *G06F 9/46* (2006.01)
(52) U.S. Cl. ...................... 709/200; 719/317
(58) Field of Classification Search ............ 700/90; 709/319, 320, 224, 223, 200; 705/64; 395/200.57; 719/315, 320; 717/147
   See application file for complete search history.

(56) References Cited

U.S. PATENT DOCUMENTS

| 5,657,480 | A | * | 8/1997 | Jacobson | 713/500 |
|---|---|---|---|---|---|
| 5,887,141 | A | * | 3/1999 | Trugman | 709/227 |
| 5,946,463 | A | | 8/1999 | Carr et al. | |
| 6,198,824 | B1 | | 3/2001 | Shambroom | |
| 6,477,701 | B1 | | 11/2002 | Heistermann et al. | |
| 6,675,193 | B1 | * | 1/2004 | Slavin et al. | 709/200 |
| 6,808,472 | B1 | * | 10/2004 | Hickman | 482/8 |
| 7,027,975 | B1 | * | 4/2006 | Pazandak et al. | 704/9 |
| 7,036,010 | B2 | * | 4/2006 | Wray | 713/151 |
| 7,039,724 | B1 | * | 5/2006 | Lavian et al. | 709/250 |
| 7,058,645 | B2 | | 6/2006 | Seto et al. | |
| 7,140,025 | B1 | * | 11/2006 | Dillow et al. | 719/313 |
| 2002/0019844 | A1 | | 2/2002 | Kurowski et al. | |
| 2002/0143866 | A1 | | 10/2002 | Lewis et al. | |
| 2003/0025727 | A1 | | 2/2003 | Rath et al. | |
| 2003/0177187 | A1 | * | 9/2003 | Levine et al. | 709/205 |
| 2003/0182308 | A1 | | 9/2003 | Ernst et al. | |
| 2003/0191803 | A1 | | 10/2003 | Chinnici et al. | |
| 2003/0204645 | A1 | | 10/2003 | Sharma et al. | |
| 2004/0039964 | A1 | | 2/2004 | Russell et al. | |
| 2004/0078341 | A1 | * | 4/2004 | Steichen | 705/64 |

(Continued)

FOREIGN PATENT DOCUMENTS

WO    WO2005074408    8/2005

OTHER PUBLICATIONS

Bhatti, et al., "Object Serialization and Deserialization Using XML", Advances in Data Management 2000, Tata McGraw-Hill Publishing Company Ltd, CSI, 2000, 10 pages.

(Continued)

*Primary Examiner*—Kidest Bahta
(74) *Attorney, Agent, or Firm*—Lee & Hayes, PLLC

(57) ABSTRACT

A command line environment is configured to receive a command line that implicates a plurality of remote nodes. The command line environment is configured to establish a session, which may be persistent, to each implicated remote node, and to initiate execution of the remote command on those nodes. The session may be assigned to a variable, and the remote execution may be performed concurrently. Results of the remote execution are received and may be aggregated into an array. The command line environment may distribute the task of establishing sessions to other systems to improve performance.

32 Claims, 6 Drawing Sheets

U.S. PATENT DOCUMENTS

| | | | |
|---|---|---|---|
| 2004/0139305 A1* | 7/2004 | Arimilli et al. | 712/227 |
| 2005/0154978 A1 | 7/2005 | Albornoz et al. | |
| 2005/0198648 A1* | 9/2005 | Wray et al. | 719/317 |

OTHER PUBLICATIONS

Hericko et al., "Object Serialization Analysis and Comparison in Java and .NET", ACM SIGPLAN Notices, Aug. 2003, vol. 38(8), pp. 44-54.

PCT International Search Report and Written Opinion for Application No. PCT/US04/23467, dated May 11, 2006, 9 pages.

Preiss et al, "Data Structures and Algorithms with Object-Oriented Design Patterns in C++: Constructors and Destructors," retrieved at <<http://www.brpreiss.com/books/opus4/html/page598.html>> on Feb. 11, 2008, 1997, 1 pg.

Preiss et al, "Data Structures and Algorithms with Object-Oriented Design Patterns in C++: Default Constructor," retrieved at <<http://www.brpreiss.com/books/opus4/html/page599.html>> on Feb. 11, 2008, 1997, 1 pg.

Preiss et al, "Data Structures and Algorithms with Object-Oriented Design Patterns in C++: Objects and Classes," retrieved at <<http://www.brpreiss.com/books/opus4/html/page596.html>> on Feb. 11, 2008, 1997, 1 pg.

Office Action from the Patent Office of the State Intellectual Property Office of the People's Republic of China, Application No. 200480001253.5, mailed Oct. 10, 2008, 11 pgs.

Nacar, et al., "Designing a Grid Computing Environment Shell Engine", Proceedings of the 2003 International Conference on Internet Computing, Jun. 2003, pp. 1-5.

Unknown, "Sun Cluster 2.2 System Administration Guide Jul. 2000 Release",retrieved at <<http://dlc.sun.com/pdf/806/5343/206-50343.pdf>>, Jul. 2000, pp. 27-41.

Supplementary European Search Report from the European Patent Office for Application No. 04778815.3 - 2211 / 1723569, mailed on Apr. 22, 2009, 8 pgs.

* cited by examiner

Process for Remote Execution

Process for Enhancing Performance of Remote Execution

REMOTE SYSTEM ADMINISTRATION USING COMMAND LINE ENVIRONMENT

TECHNICAL FIELD

This invention relates to network system administration, and more particularly, to a command line environment for remote network system administration.

BACKGROUND OF THE INVENTION

Computing systems and networks today are complex and often vast. Some large enterprises may have thousands of individual computing systems interconnected over local and wide area networks. Keeping all these computing systems running smoothly is crucial to the success of an enterprise. For this reason, system developers endeavor to provide useful administrative tools for system administration.

Because the typical system administrator is a very sophisticated user, administrative tools are often more complex than applications intended for the consuming public. For example, command line environments are still popular with system administrators, even though the graphical user interface is preferred by ordinary users. Often, administrators can perform relatively complex tasks quicker using a command line than with a graphical interface.

The typical command line environment is provided by a shell operating on a computing system. Typically, the command line environment provides a few core commands that the administrator can execute. For more complex tasks, typical command line environments allow commands to be "pipelined," which means that two or more commands can be entered on the same command line, and the results of each command are "piped" or passed to the next command in the pipeline.

Despite their popularity with administrators, there has been little attention paid to making the command line environments more usable and powerful, especially for remote system administration. For instance, frequent is the case when an administrator must perform some action on a remote computer or using information gathered from one or more remote computers. However, even relatively simple tasks prove daunting when remote execution is called for. In addition, the complexities of state of the art computing systems are re-defining what "remote" means. For example, today a "remote" system may be a different process executing on the same computer, yet existing command line environments ignore these situations.

Until now, a command line environment that provides sophisticated remote system administration has eluded those skilled in the art.

SUMMARY OF THE INVENTION

The invention is directed to mechanisms and techniques for sophisticated remote system administration. Briefly stated, a command line environment is configured to receive a command line that implicates a plurality of remote nodes. The command line environment is configured to establish a session, which may be persistent, to each implicated remote node, and to initiate execution of the remote command on those nodes. The session may be assigned to a variable, and the remote execution may be performed concurrently. Results of the remote execution are received and may be aggregated into an array. The command line environment may distribute the task of establishing sessions to other systems to improve performance.

DETAILED DESCRIPTION

The following detailed description pertains to one illustrative implementation of a command line environment for executing remote commands. This disclosure is for the purpose of illustration only, and is not to be viewed as the only method of implementing the invention.

Figure 1:
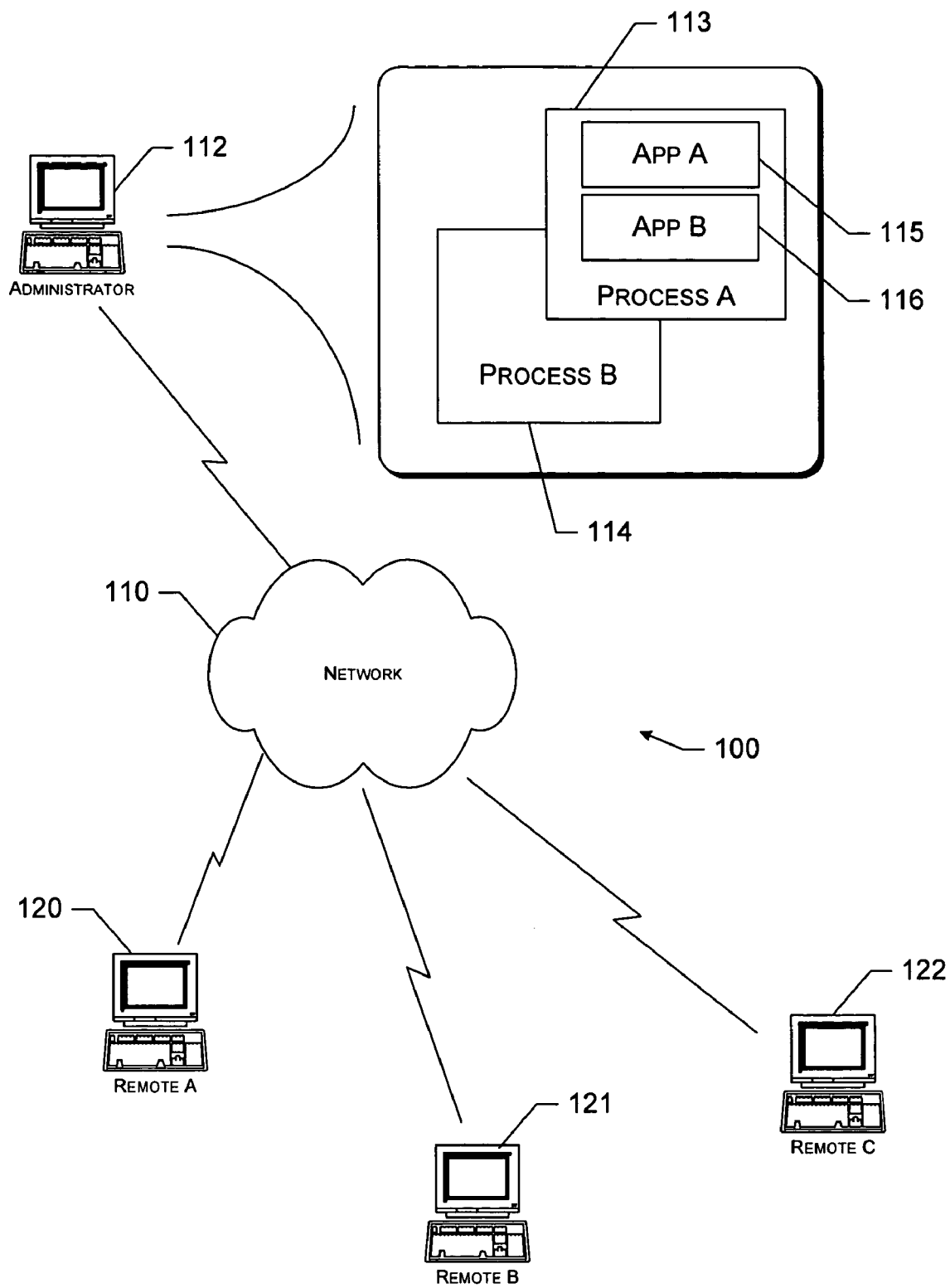
FIG. 1 is a functional block diagram generally illustrating a computing environment that benefits from the mechanisms and techniques described in conjunction with the present invention.

FIG. 1 is a functional block diagram generally illustrating a computing environment 100 that benefits from the mechanisms and techniques described in conjunction with the present invention. Illustrated are several computing systems connected over a network 110. More particularly, the network 110 connects an "administrator" 112 computing system to several remote computing systems (e.g., Remote A 120, Remote B 121, and Remote C 122. The several computing systems may be parts of an enterprise network or any other administered network environment. The remote computing systems may be physically located anywhere.

The network 110 may be any mechanism for connecting different computing systems, such as a local area network, a wide area network, or the Internet. Each of the remote computing systems may be an individual computing system in use by an end user, such as an employee or subscriber.

The administrator 112 is a computing system used by a system administrator or the like to maintain the computing environment 100. In other words, the administrator 112 runs commands and performs tasks that may query the status or state of other computing systems in the computing environment, and make changes to one or more of the other computing systems. The administrator 112 may also query or alter the state of the network 110. The administrator 112 includes an execution environment that supports one or more processes, such as Process A 113 and Process B 114. Each process hosts at least one program or application. In addition, one process (e.g., Process A 113) may host one or more application domains, such as App1 115 and App2 116. Application domains are a relatively new mechanism that allows multiple applications to execute within the same process, yet still be isolated from other applications. The application domain is a logical and physical boundary created around an application by a runtime environment. Each application domain prevents the configuration, security, or stability of its respective application from affecting other applications in other application domains.

Each computing system in the computing environment 100 supports a command line environment that implements the mechanisms and techniques described here. As described in greater detail below in conjunction with FIG. 2, the administrator 112 includes a command line environment that allows a user to execute commands both locally and remotely. The administrator 112 is configured to establish a session between its local command line environment (also referred to as the "shell") and any of one or more remote systems. In this implementation, the remote systems include remote computing devices (e.g., remote A 120), as well as other processes or application domains on the local computing system (i.e., the administrator 112). Accordingly, unlike existing systems, a user of the administrator 112 may establish a connection and remotely execute commands either on remote computing devices or in another process or application domain on the local computing device. In addition, the administrator 112 creates separate sessions to each remote system and so may initiate a command for simultaneous execution on multiple remote systems, which has not been done before now.

Figure 2:
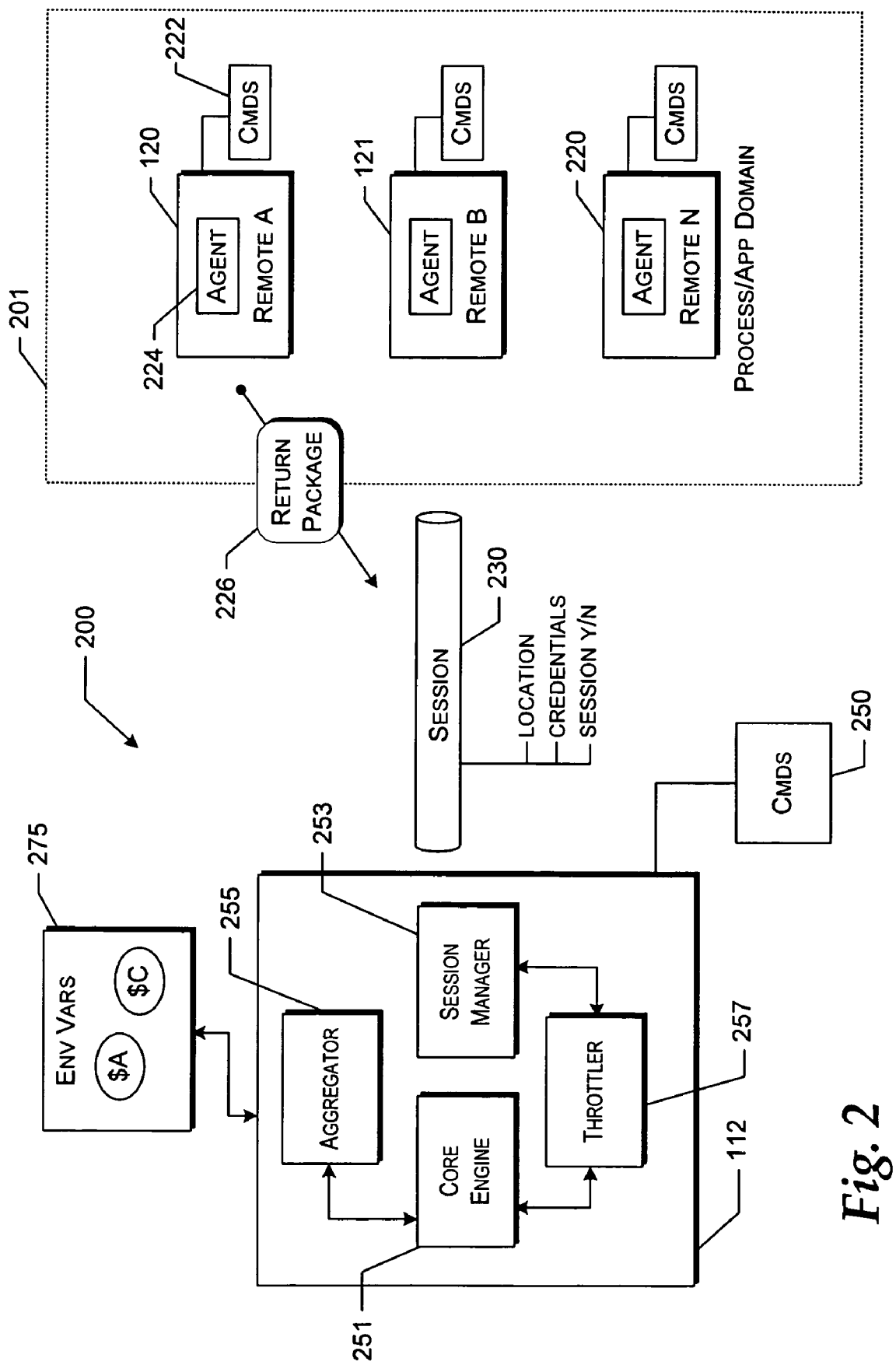
FIG. 2 is a functional block diagram illustrating in greater detail the operation of the command line environment introduced in FIG. 1.

FIG. 2 is a functional block diagram illustrating in greater detail the operation of the command line environment 200 introduced in FIG. 1. Illustrated in FIG. 2 are the administrator 112 and several remote systems 201. In this example, two of the remote systems (i.e., Remote A 120 and Remote B 121) are remote computing devices. In contrast, another remote system (i.e., Remote N 220) may be another process on the local computer, executing code in another application domain, or the like. In this implementation, the administrator 112 performs remote administration on the remote systems 201.

Each remote system includes several "commands" (e.g., cmds 222). The commands are relatively small code components that are used to perform system administrative tasks. Examples may include a "process" command for identifying each process executing on a computing device, a "dir" command for identifying the files in a directory on a computing device, and many others. However, the commands may include any executable component on a remote system.

Each of the remote systems 201 also includes a remote agent (eg., Agent 224), which is a component that responds to remote requests to execute one or more commands (e.g., cmds 222). In addition, the agents are configured to take the results of the execution of one or more commands and create a package that is returned to the requesting device. In one implementation, the package takes the form of a serialized object that includes the results of execution, as well as meta information such as the date and time of invocation, identifying information about the particular remote system from which the results originated, and information about the requesting entity. This and perhaps other information is bound up into a return package 226 for transmission back to the requesting entity (e.g., the administrator 112).

The administrator 112 includes components that support the command line environment 200. More specifically, the administrator 112 includes commands 250 similar to the commands resident on the remote systems, that are used in system administration. The operations of the command line environment 200 are governed by a core engine 251 that is configured to manage the flow of operation and information among each of the several components, and between the administrator 112 and each remote system 201. The core engine enables user input to be received (such as through a shell or the like) in the form of command line instructions, and acted upon. The particular format of such a command line instruction and the techniques for handling one are described in greater detail below.

Additionally, the command line environment 200 includes a session manager 253 function. The command line environment 200 is configured to execute remote commands on multiple remote systems concurrently. To achieve this, a different "session" is established between the administrator 112 and any remote systems 201 identified in a command line instruction. The "session" 230 represents a connection between the administrator 112 and the associated remote systems 201. In response to a command line instruction that implicates a remote system, the session manager 253 interacts with the agent (e.g., Agent 224) on the remote system to invoke a process on the remote system and to create a connection to that process. That connection is termed a "session." One or more sessions may be established from the command line using a particular command, such as may take the following form:

$C=new/session−node N1,N2,N3−creds {XXX}−session yes

In this example, the phrase "new/session" indicates that a new session is to be created. The parameter "-node N1,N2,N3" indicates the nodes (remote systems) to which the session(s) are being created. As an alternative to the "-node" parameter, a "-workerprocess" parameter may be used to create a session to an alternate process on the local machine, or a "-appdomain" parameter may be used to create a session to another application in a different application domain in the same process. The parameter "-creds {XXX}" identifies any particular logon credentials used to connect to the remote system 201. And finally, the parameter "-session yes" is used to indicate whether to persist the session or not. Persisting a session is useful in the case where multiple commands may be called remotely using different command lines. Unlike prior systems, a session allows a remote process to be reused for multiple command line instructions. This ability improves automated administration and scripting.

Referring again to the example command line above, the use of the "$C=" syntax in conjunction with creating the new session assigns the new session to the environment variable "$C." Environment variables 275 are essentially variables maintained by the shell that are made available to other tasks and are often used to share information between processes or applications. By assigning a session to an environment variable, different commands can make use of the session by simply referring to the environment variable. Also, since a single session can include connections to multiple remote systems, several commands can be issued by issuing them to a single environment variable, thus greatly simplifying larger scale ("1:many") administrative tasks. What follows here is an illustrative command line that may be used to take advantage of this capability:

$A=rcmd $C get/process

This example builds on the prior example by invoking the remote command (rcmd) get/process on the remote systems having sessions identified in the environment variable "$C". In accordance with the above command line, each remote command is initiated simultaneously. This feature is a great enhancement over existing command line environments, which would have required the coding of a loop or similar operation to launch the command on each remote system. In this way, the technique of this implementation achieves the performance benefit of concurrent command processing, rather than having to serially execute each remote command.

In addition, the results of each of the individual remote commands are aggregated into the environment variable "$A" by an aggregator 255. In other words, when one remote system having a connection referenced in the session "$C" returns its return package (e.g., return package 226), the aggregator 255 includes that data in the specified environment variable, "$A" in this instance. In this way, subsequent commands and tasks have access to the results of performing the command on multiple remote systems. The results are stored in the environment variable as an aggregated array. The aggregator 255 stores information that associates the origin of each results package with its particular index in the environment variable. In this way, components of the command line environment 200 have ready access to the results on a per-machine, per-process, or per-application domain basis if needed or desired. In one implementation, the aggregated results are made available in a synchronous fashion, e.g. when all the results are returned. Alternatively, the results may be made available through the environment variable as they are received.

In a similar vein, the core engine 251 may cause a command line to be executed in a disaggregated way, such that a command can have access to the results of a remote execution as the results are returned. For example, if a user were interested in locating any one of multiple remote computing devices that had in excess of a certain amount of free storage, then the execution of the command could terminate appropriately once the first such device were located. In this case, the aggregator 255 and the core engine 251 may interact so that the results are evaluated asynchronously. In this case, the origin information for the results is still made available.

The case can be envisioned where a command is intended for execution on very many remote devices, such as perhaps hundreds or even thousands. In that case, it may be preferable not to simultaneously launch all the commands at once. If so, a "throttler" function 257 may be used for performance enhancement. The throttler 257 interacts with the core engine 251 and perhaps the session manager 253 to limit the number of connections that are made in a session so that the network or the resources of the administrator 112 are not overly burdened. For example, a "-throttle 50" parameter may be used on the command line to indicate that no more than 50 connections should be active at any one time. This enhancement helps to prevent overburdening the resources of the administrator 112 or the network. Alternatively, the throttler 257 could also interact with other performance-based mechanisms to regulate the performance impact of a remote command execution. For instance, the throttler 257 may interact with a QOS (Quality Of Service) mechanism to limit the impact on network bandwidth. In addition, the throttler 257 could be configured to interact with each remote agent to regulate the performance impact on each remote system, such as processor or memory load, or the like.

Figure 3:
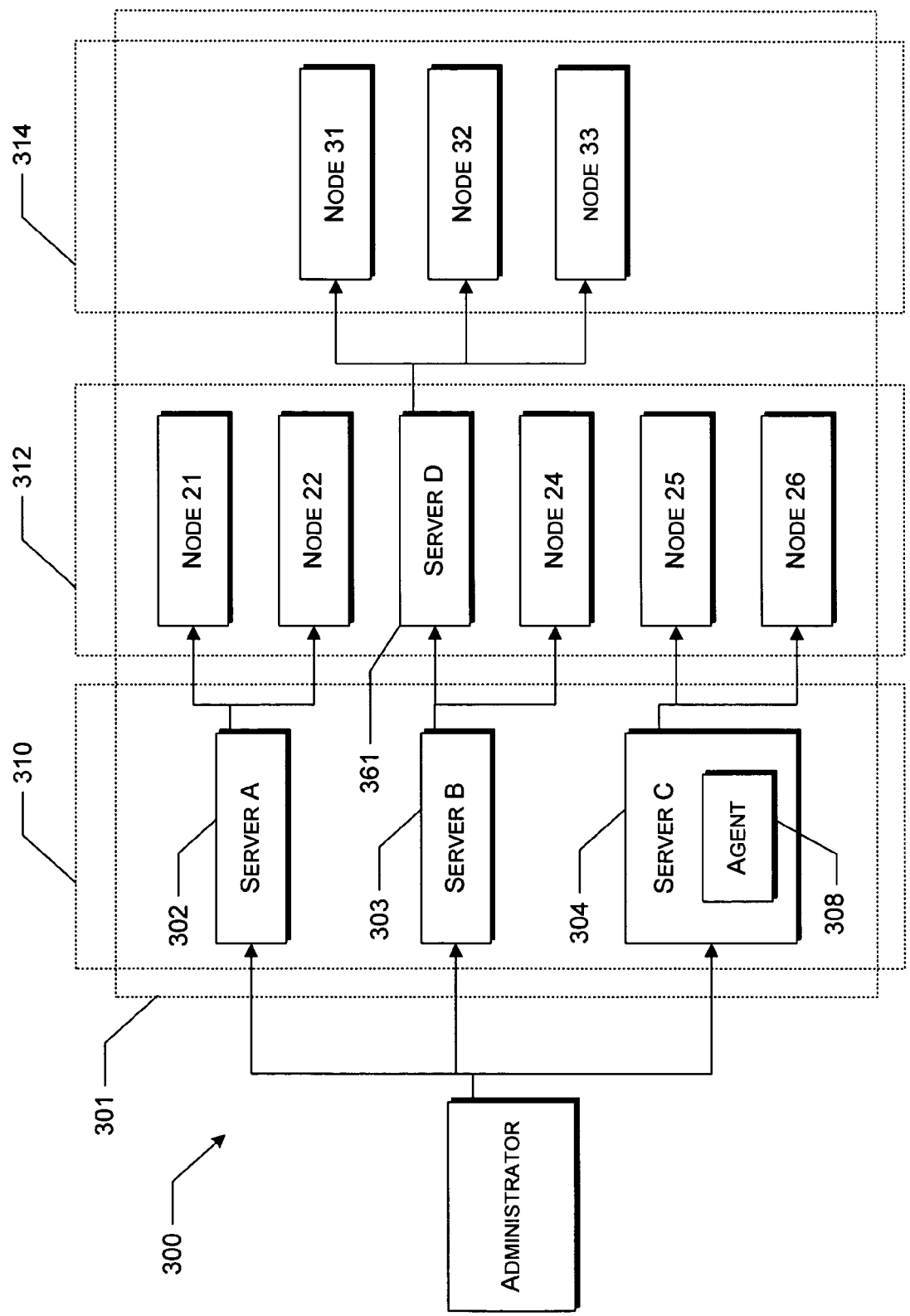
FIG. 3 is a functional block diagram of a hierarchical topology of computing systems in a networked environment that may be administered by the command line environment described.

FIG. 3 is a functional block diagram of a hierarchical topology 300 of computing systems in a networked environment that may be administered by the command line environment just described. It can be envisioned that the system described above may be used to issue remote instructions to very many remote devices, such as in a large enterprise network. Accordingly, the command line system implements the hierarchical topology 300 to avoid overburdening the administrator 112 when a large number of connections are being made.

As illustrated, the topology 300 includes the administrator 112 and a distributed network 301 of computing devices. The distributed network 301 includes a hierarchical layout with a first level 310 of computing devices composed of servers (i.e., Server A 302, Server B 303, and Server C 304) that each control a group of child computing devices at a second level 312. One or more of the computing devices at the second level (e.g., Server D 361) may in turn have its own children at a third level 314, and so on. The distributed network 301 shown in FIG. 3 is illustrative only, and it will be appreciated that complex enterprise networks can have multiple layers of servers and thousands of computing devices.

In this implementation, several of the computing devices in the distributed network 301 include components (e.g., Agent 308) that may interact with the administrator 112 in a cooperative way to help distribute the performance of a command instruction. More specifically, a command line instruction issued at the administrator 112 may affect a very large number of the computing devices in the distributed network 301. Accordingly, the administrator 112, rather than locally initiate all the connections necessary to perform the instruction, distributes the task among several children in the distributed network 301. This distribution may be performed in at least two ways.

First, in the case where the administrator 112 does not have knowledge of the layout of the distributed network 301, the administrator 112 may issue the command instruction to each server in the first level 310 with further instructions to cause the command to be executed on each of their children or any of their children that are in an identified set of affected nodes. In that way, the task of actually launching each connection is distributed to other computing devices. The computing devices in the first level 310 may additionally delegate some of the execution to subordinate computing devices in the second level 312, such as Server D 361.

Second, in the case where the administrator 112 has knowledge of the layout of the distributed network 301 and can identify which leaf nodes are controlled by which servers, the administrator 122 may decompose the command into subcommands for each branch in the distributed network 301 having affected nodes. Then the administrator 112 issues those subcommands directly to the controller for the affected nodes. In essence, this technique allows the administrator 112 to retain governance over which server or node in the distributed network 301 performs the actual execution of the command instruction. Additionally, this technique simplifies the task to be performed by the subordinate computing devices in that they do not need to discover whether they have affected children.

It should be noted that each of these techniques is simplified because the return results (see FIG. 2) include sufficient information to identify the origin of the results and the command instruction to which the results pertain. In the absence of this information, the administrator 112 and each delegate would need to coordinate to ensure that the returned results could be attributed to a particular node, if that information were required.

Figure 4:
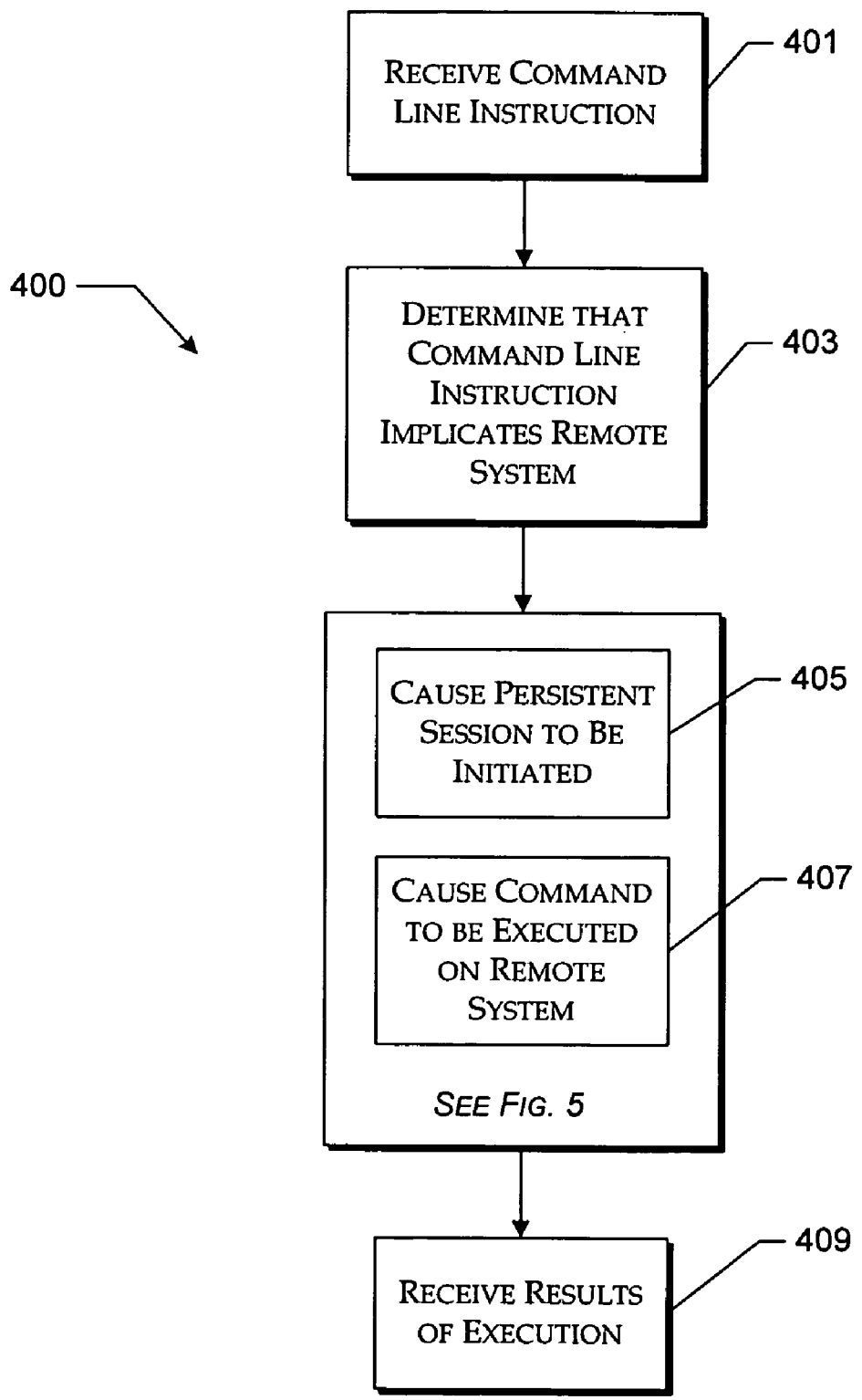
FIG. 4 is a logical flow diagram generally illustrating steps that may be performed by a process for remotely executing at least a portion of a command line instruction.

FIG. 4. is a logical flow diagram generally illustrating steps that may be performed by a process 400 for remotely executing at least a portion of a command line instruction. The process 400 begins at step 401, where a command line is received by a command line execution environment. Although any command line execution environment suitable for implementing the described techniques is acceptable, the command line environment described in co-pending U.S. patent application Ser. No. 10/693,785, entitled Administrative Tool Environment, filed on Oct. 24, 2003, is especially well suited. That U.S. Patent Application is expressly incorporated herein by reference in its entirety.

At step 403, it is determined that the received command line includes at least one command to be executed remotely on one or more remote systems. Remote execution includes execution on either a remote computing device, another process on the local computing device, or a task in another application domain within the same local process.

At steps 405 and 407, the command line environment causes a persistent session to be initiated to each identified remote system, and causes each remote system to execute the remote command. Alternatively, a single session may be used that includes separate connections to each remote device. As mentioned above, the persistent session may be assigned to an environment variable. In addition, each connection in the session may be serially or concurrently caused to execute the remote command. A performance enhancement to these steps is illustrated in FIG. 5 and described below.

At step 409, the results of the remote execution of the commands is received. As mentioned, the results make be in the form of a return package or serialized object that includes the results of the execution as well as other identifying information about which remote node executed the command and the like.

Figure 5:
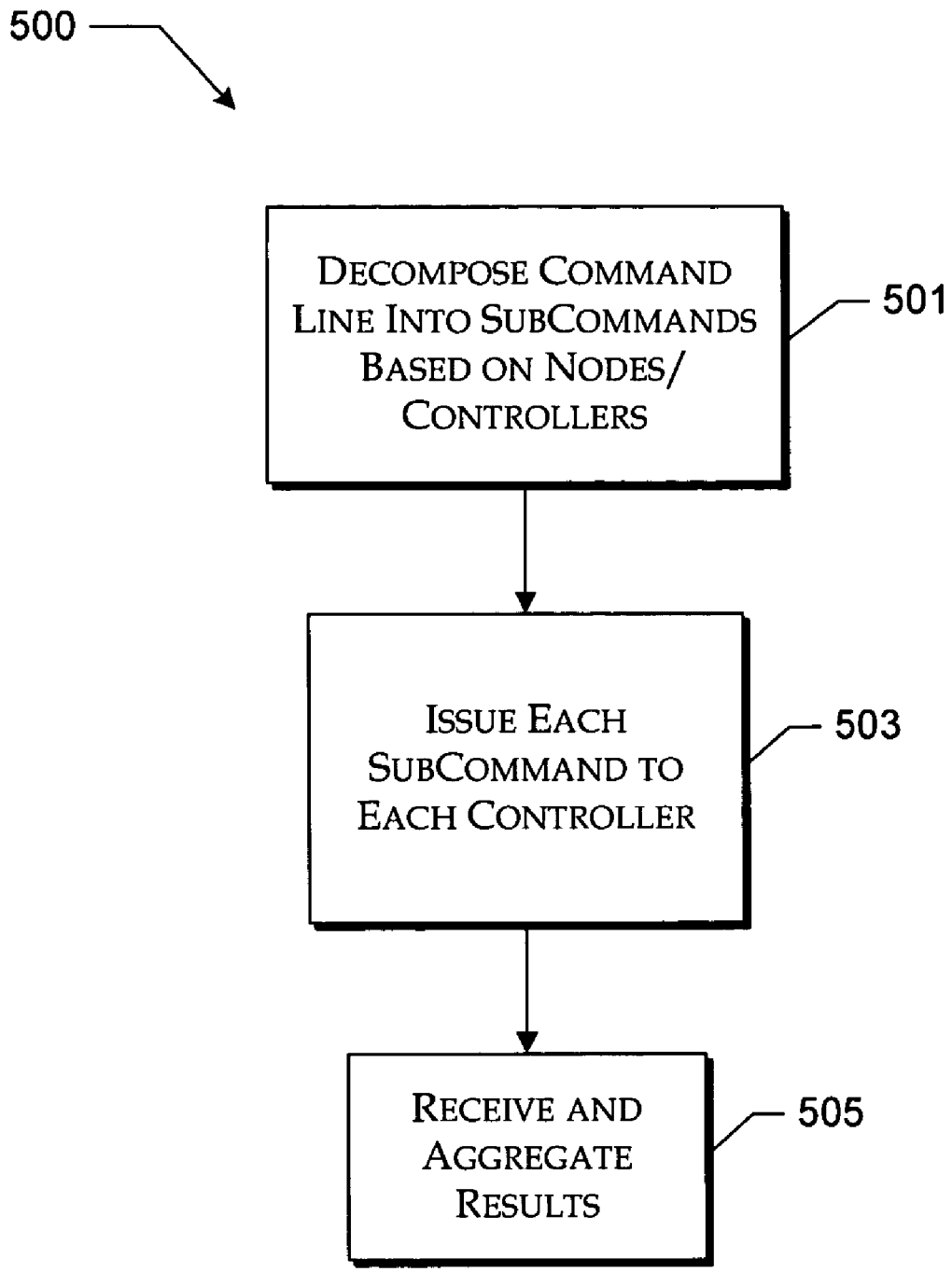
FIG. 5 is a logical flow diagram generally illustrating a process for enhancing the performance of the command line environment when issuing a remote command to a large number of remote devices.

FIG. 5 is a logical flow diagram generally illustrating a process 500 for enhancing the performance of the command line environment when issuing a remote command to a large number of remote devices. The process 500 begins at step 501, where the command line is decomposed into a number of subcommands based on which affected nodes are governed by which controller in a set of controllers. Then, at step 503, each subcommand is issued to each identified controller for that particular controller's affected nodes. Finally, at step 505, the results that are returned from each controller are aggregated. Because each of the results includes information about the originating node, the aggregation step does not lose valuable information about which node generated the results, if that is information is necessary.

The command line environment described above has several advantages over existing systems. The ability to persist a session allows a remote process to be reused for multiple commands. Multiple connections may be aggregated into a session, allowing simple concurrent processing of a remote command without resort to worker threads or the like. And the task of executing the remote command may be distributed to other systems to enhance performance. These and other advantages will become apparent to those skilled in the aft.

Figure 6:
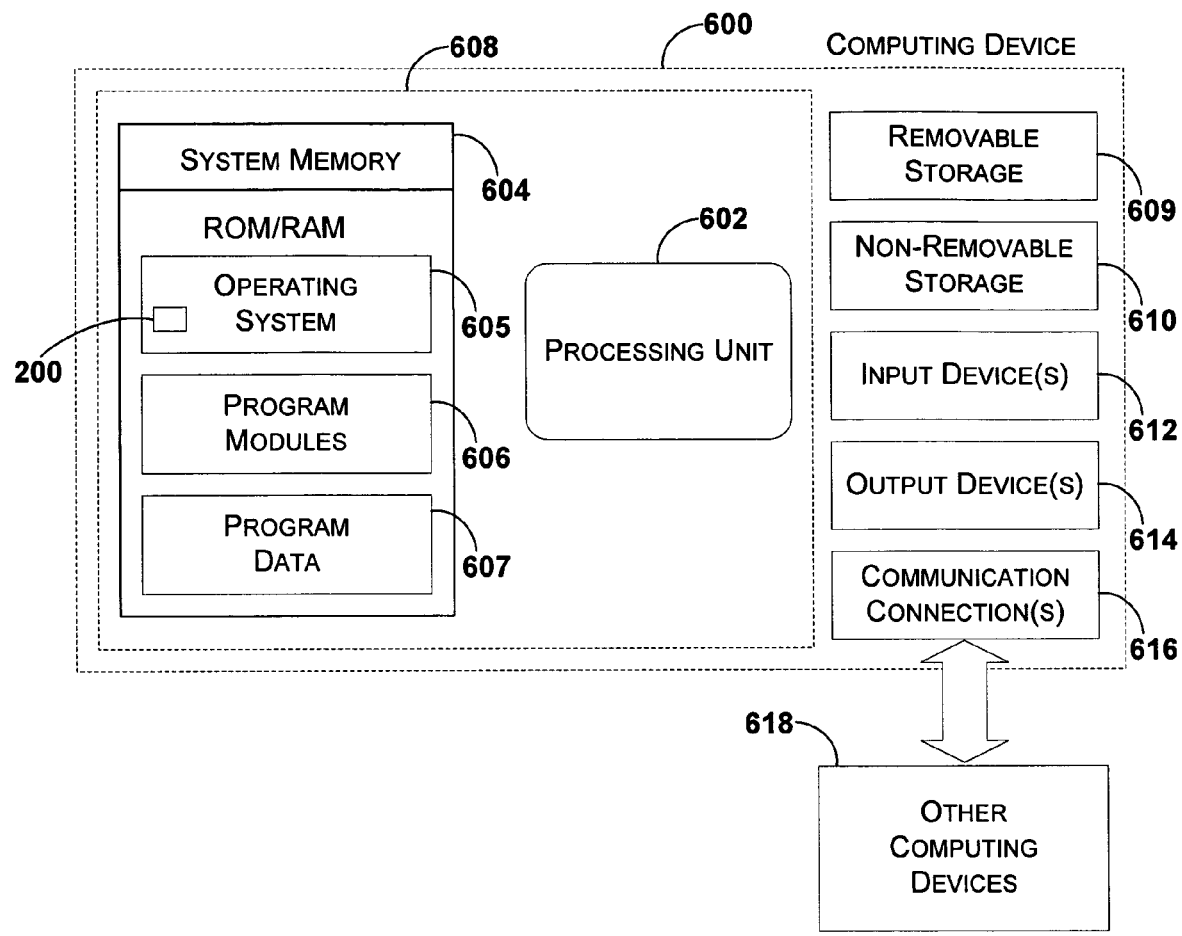
FIG. 6 is an exemplary computing device that may use an illustrative command line environment.

FIG. 6 illustrates an exemplary computing device that may be used in an exemplary command line environment. In a very basic configuration, computing device 600 typically includes at least one processing unit 602 and system memory 604. Depending on the exact configuration and type of computing device, system memory 604 may be volatile (such as RAM), non-volatile (such as ROM, flash memory, etc.) or some combination of the two. System memory 604 typically includes an operating system 605, one or more program modules 606, and may include program data 607. The operating system 606 include a component-based framework 620 that supports components (including properties and events), objects, inheritance, polymorphism, reflection, and provides an object-oriented component-based application programming interface (API), such as that of the .NET™ Framework manufactured by Microsoft Corporation, Redmond, Wash. The operating system 605 may also include a command line environment 200, such as that described above. This basic configuration is illustrated in FIG. 6 by those components within dashed line 608.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by removable storage 609 and non-removable storage 610. Computer storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of device 600. Computing device 600 may also have input device(s) 612 such as keyboard, mouse, pen, voice input device, touch input device, etc. Output device(s) 614 such as a display, speakers, printer, etc. may also be included. These devices are well know in the art and need not be discussed at length here.

Computing device 600 may also contain communication connections 616 that allow the device to communicate with other computing devices 618, such as over a network. Communication connections 616 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

The invention claimed is:

1. A computer-readable storage medium having computer-executable instructions thereon which, when executed by a computer enable remote execution of a command, the instructions comprising:

receiving a command line instruction including a remote command, the remote command identifying a task of execution to be performed on a remote system;

initiating a session with at least two remote systems;

assigning each session to a command line environment variable configured such that a plurality of commands can concurrently use the session by referring to the environment variable, wherein a command line environment receiving the command line environment variable is configured to execute commands on a local system and the remote system; and causing the remote command to be executed concurrently on each of the at least two remote systems, including issuing the remote command to the environment variable, wherein the environment variable is a variable maintained by a local command line environment and the environment variable is further configured such that the variable is used to share information between processes or applications.

2. The computer-readable storage at medium recited in claim 1, wherein the session comprises a connection between a system on which the command line instruction is received.

3. The computer-readable storage medium recited in claim 1, wherein the session is initiated as a persistent session that is available to perform subsequent remote commands.

4. The computer-readable storage medium recited in claim 3, further comprising receiving a second command line instruction including a second remote command and causing the second remote command to be executed using the persistent session.

5. The computer-readable storage medium recited in claim 1, wherein the remote system comprises a remote agent configured to return information to the local system wherein the information comprises at least one of a result of the execution, meta information, and information about the remote system from which the result originated.

6. The computer-readable storage medium recited in claim 1, wherein the remote system comprises an alternate process.

7. The computer-readable storage medium recited in claim 1, wherein the remote system comprises an alternate application domain located on a local computing system.

8. The computer-readable storage medium recited in claim 1, wherein causing the remote command to be executed comprises delegating the step of causing the remote command to be executed to a controller associated with a subset of the at least two remote systems.

9. The computer-readable storage medium recited in claim 8, wherein each of the at least two remote systems comprises a node in a hierarchical network topology and the controller holds a position in the hierarchy between the subset of the at least two remote systems and a system receiving the command line instruction.

10. The computer-readable storage medium recited in claim 1, wherein the remote command is concurrently executed on each of the at least two remote systems.

11. The computer-readable storage medium recited in claim 1, further comprising aggregating results of executing each remote command.

12. The computer-readable storage medium recited in claim 11, wherein the results are aggregated into an array.

13. The computer-readable storage medium recited in claim 11, wherein the results include information that identifies on which remote system the results originated.

14. A computer-executable method of remote execution of a command, the method implemented on a computing device by a processor configured to execute instructions that, when executed, direct the computing device to perform acts comprising:
  receiving at a local system a first command line that identifies a remote system;
  causing a session to be created between the local system and the remote system, the session including a connection to a remote process resident on the remote system;
  assigning the session to a command line environment variable configured such that a plurality of commands can concurrently use the session by referring to the environment variable, wherein a command line environment receiving the command line environment variable is configured to execute commands on a local system and the remote system;
  issuing a remote command to the environment variable to cause the remote command to be executed in the remote process; and
  storing results of the remote command in an environment variable associated with the session, wherein the environment variable is a variable maintained by a local command line environment and the environment variable is further configured such that the variable is used to share information between processes or applications.

15. The computer-executable method recited in claim 14, further comprising: causing a second remote command to the environment variable to cause the second remote command to be concurrently executed in the remote process and storing results of the second remote command in the environment variable.

16. The computer-executable method recited in claim 14, wherein causing the session to be created comprises creating the environment variable and making the variable available to other tasks.

17. The computer-executable method recited in claim 16, wherein the first command line further comprises a parameter that identifies the environment variable associated with the session.

18. The computer-executable method recited in claim 14, wherein causing a session to be created further comprises distributing the task of launching the connection to a computing device other than the local system.

19. The computer-executable method recited in claim 14, wherein the command line further identifies credentials for use in creating the session between the local system and the remote system.

20. A computer-readable storage medium having computer-executable instructions for performing the method recited in claim 14.

21. A computer-readable storage medium having computer-executable components thereon which, when executed by a computer, implement a system comprising:
  a session manager configured to:
    create and maintain sessions between a local system and one or more remote systems, each session being capable of hosting a plurality of connections between the local system and remote systems;
    assign each session to a command line environment variable configured such that a plurality of commands can concurrently use each session by referring to the environment variable, wherein the environment variable is a variable maintained by a local command line environment and the environment variable is further configured such that the variable is used to share information between processes or applications and a command line environment receiving the command line environment variable is configured to execute commands on a local system and the remote system;
    store the environment variable in a memory; and
    issue a remote command to the environment variable to cause the remote command to be executed on the one or more remote systems;
  an aggregator configured to receive results of remote execution of a command, the results being each associated with a remote system, the aggregator being further configured to aggregate the results into an array; and
  a throttler configured to, upon request, limit a number of active connections within each session.

22. The computer-readable storage medium of claim 21, wherein each of the results in the array is associated with the remote system on which the results originated.

23. The computer-readable storage medium of claim 21, wherein the aggregator is further configured to make the results available in a disaggregated fashion.

24. The computer-readable storage medium recited in claim 21, wherein the aggregator is further configured to aggregate the results into an environment variable associated with a session created by the session manager.

25. The computer-readable storage medium recited in claim 21, wherein the throttler is further configured to interact with interact with other performance-based mechanisms to regulate a performance impact of a remote command execution.

26. The computer-readable storage medium recited in claim 25, wherein the other performance-based mechanisms comprises a Quality Of Service mechanism.

27. The computer-readable storage medium recited in claim 25, wherein the other performance-based mechanisms comprises an agent on a remote system that is configured to regulate an impact on resources on the remote system.

28. The computer-readable storage medium recited in claim 21, further comprising a core engine configured to manage a flow of information among each of the several components.

29. The computer-readable storage medium recited in claim 28, wherein the core engine is further configured to delegate a task of initiating a session to another system in a hierarchy of remote systems.

30. The computer-readable storage medium recited in claim 21, wherein the remote system comprises a remote agent configured to return information to the local system wherein the information comprises at least one of a result of the execution, meta information, and information about the remote system from which the result originated.

31. The computer-readable storage medium recited in claim 21, wherein the remote system comprises an alternate process.

32. The computer-readable storage medium recited in claim 21, wherein the remote system comprises an alternate application domain.

* * * * *